( 12 ) United States Patent
Kawamoto et al.

(10) Patent No.: US 12,365,258 B2
(45) Date of Patent: Jul. 22, 2025

(54) INFORMATION PROCESSING METHOD AND INFORMATION PROCESSING SYSTEM

(71) Applicant: Panasonic Intellectual Property Management Co., Ltd., Osaka (JP)

(72) Inventors: Hirokazu Kawamoto, Osaka (JP); Hiroaki Urabe, Osaka (JP); Naoyuki Harada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/588,866

(22) Filed: Feb. 27, 2024

(65) Prior Publication Data

US 2024/0198826 A1 Jun. 20, 2024

Related U.S. Application Data

(63) Continuation of application No. 17/224,638, filed on Apr. 7, 2021, now Pat. No. 11,938,834, which is a (Continued)

(30) Foreign Application Priority Data

Mar. 4, 2019 (JP) .................................. 2019-038469

(51) Int. Cl.
*B60L 53/30* (2019.01)
*B60L 53/62* (2019.01)
(Continued)

(52) U.S. Cl.
CPC ............. *B60L 53/305* (2019.02); *B60L 53/62* (2019.02); *B60L 53/665* (2019.02);
(Continued)

(58) Field of Classification Search
CPC ...... B60L 53/305; B60L 53/62; B60L 53/665; B60L 2240/72; B60L 2240/622;
(Continued)

(56) References Cited

U.S. PATENT DOCUMENTS

2010/0188043 A1 7/2010 Kelty et al.
2011/0193522 A1* 8/2011 Uesugi .................... B60L 53/64
320/109

(Continued)

FOREIGN PATENT DOCUMENTS

EP 3 886 007 9/2021
JP 2003-262525 9/2003

(Continued)

OTHER PUBLICATIONS

International Search Report (ISR) issued on Mar. 24, 2020 in International (PCT) Application No. PCT/JP2020/000941.

(Continued)

*Primary Examiner* — Paul Dinh
(74) *Attorney, Agent, or Firm* — Wenderoth, Lind & Ponack, L.L.P.

(57) ABSTRACT

An information processing method for use in a computer includes: acquiring a charging state and a deterioration state of a battery; determining an upper limit of the charging state of the battery based on the deterioration state; determining a charging plan of the battery based on the upper limit of the charging state determined and the charging state; and outputting the charging plan determined.

12 Claims, 9 Drawing Sheets

Related U.S. Application Data continuation of application No. PCT/JP2020/000941, filed on Jan. 15, 2020.

(51) Int. Cl.
   *B60L 53/66*   (2019.01)
   *H01M 10/48*   (2006.01)
   *H02J 7/00*    (2006.01)

(52) U.S. Cl.
   CPC ......... *H01M 10/48* (2013.01); *H02J 7/00047* (2020.01); *H02J 7/0069* (2020.01); *H02J 7/00712* (2020.01); *B60L 2240/72* (2013.01)

(58) Field of Classification Search
   CPC ...... B60L 2240/80; B60L 53/66; B60L 53/67; B60L 58/13; B60L 58/16; B60L 53/65; H01M 10/48; H01M 10/425; H01M 10/44; H01M 2010/4271; H01M 2010/4278; H02J 7/00047; H02J 7/0069; H02J 7/00712; G06Q 50/06; G06Q 50/40; G06Q 10/02; G06Q 50/10; Y02T 10/72; Y02T 90/16; Y02T 10/70; Y02T 10/7072; Y02T 90/12; Y02T 90/167; Y04S 30/14; Y02E 60/10

USPC .......................................................... 320/109

See application file for complete search history.

(56) References Cited

U.S. PATENT DOCUMENTS

| 2013/0285608 | A1 | 10/2013 | Jikihara |
| 2019/0126766 | A1 | 5/2019 | Taguchi |

FOREIGN PATENT DOCUMENTS

| JP | 2011-158322 | 8/2011 |
| JP | 2013-15933 | 1/2013 |
| JP | 5679920 | 3/2015 |
| JP | 2018-102047 | 6/2018 |
| WO | 2013/105139 | 7/2013 |
| WO | 2015/049969 | 4/2015 |

OTHER PUBLICATIONS

Extended European Search Report issued Apr. 5, 2022 in corresponding European Patent Application No. 20767217.1.

* cited by examiner

FIG. 3

| Departure point | Scheduled departure time | Arrival point | Scheduled arrival time |
|---|---|---|---|
| Point A | 10:00 | Point B | 11:30 |
| Point B | 13:00 | Point A | 14:00 |

FIG. 4

| Charging station B /Reservation time zone | Reservation person | |
|---|---|---|
| 10:00 - 10:30 | Available | |

| Charging station A /Reservation time zone | Reservation person | sport |
|---|---|---|
| 10:00 - 10:30 | Available | lable |
| 10:30 - 11:00 | Available | Ms B |
| 11:00 - 11:30 | Available | ⋮ |
| 11:30 - 12:00 | Mr/Ms A | |
| ⋮ | ⋮ | |

FIG. 5A

| Charging state | Battery type A | | | Battery type B |
|---|---|---|---|---|
| | Deterioration amount | | | |
| | 5%≥Cumulative deterioration amount | 5%>Cumulative deterioration amount≥10% | 10%>Cumulative deterioration amount≥15% | ... |
| 100% | a1 | a2 | a3 | ... |
| 95% | b1 | b2 | b3 | ... |
| 90% | c1 | c2 | c3 | ... |
| 85% | d1 | d2 | d3 | ... |
| ... | ... | ... | ... | ... |

FIG. 5B

| Battery type B | | | | |
|---|---|---|---|---|
| Battery type A | | | | |
| | Deterioration amount | | | |
| Charging state | 5% ≥ Cumulative deterioration amount | 5% > Cumulative deterioration amount ≥ 10% | 10% > Cumulative deterioration amount ≥ 15% | ... |
| 100% | a1+Δe1 | a2+Δe2 | a3+Δe3 | ... |
| 95% | b1+Δf1 | b2+Δf2 | b3+Δf3 | ... |
| 90% | c1+Δg1 | c2+Δg2 | c3+Δg3 | ... |
| 85% | d1+Δh1 | d2+Δh2 | d3+Δh3 | ... |
| ... | ... | ... | ... | ... |

FIG. 6A

First recommended plan
    Charging up to 80% through fast charging from 10:00 to 10:30 at charging station A
    Price: aaa yen
    Benefits: Gift presented Second recommended plan
    Charging up to 80% through fast charging from 20:00 to 21:00 at charging station B
    Price: bbb yen
    Benefits: 20% discount from regular charging

Reservation has been made with the following contents
    Charging station name: Charging station A
    (Address; B-C, A-cho)
    Charging type: Fast charging
    Charging time: 30 minutes from 14:00 to 14:30
    Charging amount: 75%
    Price: ccc yen
    Benefits: 5% discount

FIG. 6C

Upper limit of charging: 85%

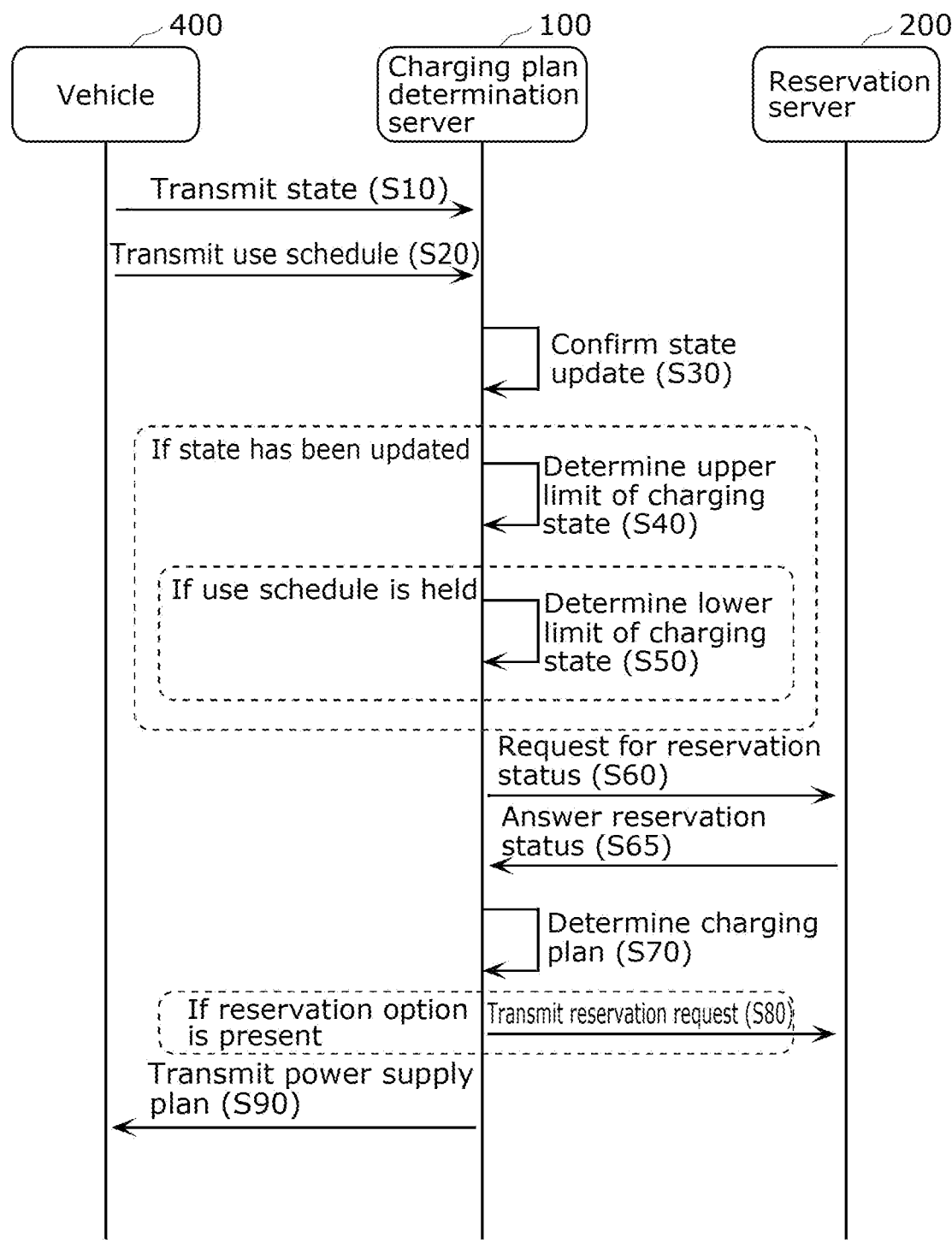

INFORMATION PROCESSING METHOD AND INFORMATION PROCESSING SYSTEM

CROSS REFERENCE TO RELATED APPLICATIONS

This is a continuation of U.S. application Ser. No. 17/224,638, filed Apr. 7, 2021, which is a continuation application of PCT International Application No. PCT/JP2020/000941 filed on Jan. 15, 2020, designating the United States of America, which is based on and claims priority of Japanese Patent Application No. 2019-038469 filed on Mar. 4, 2019. The entire disclosures of the above-identified applications, including the specifications, drawings and claims are incorporated herein by reference in their entirety.

FIELD

The present disclosure relates to an information processing method and an information processing system.

BACKGROUND

The present disclosure relates to an information processing method and an information processing system.

CITATION LIST

Patent Literature

PTL 1: Japanese Patent No. 5679920

SUMMARY

Technical Problem

The suppression of the battery deterioration is limited in the conventional technologies.

Thus, it is an object of the present disclosure to provide an information processing method and an information processing system capable of more effectively suppressing the battery deterioration than in conventional technologies.

Solution to Problem

An information processing method for use in a computer according to one aspect of the present disclosure includes: acquiring a charging state and a deterioration state of a battery; determining an upper limit of the charging state of the battery based on the deterioration state; determining a charging plan of the battery based on the upper limit of the charging state determined and the charging state; and outputting the charging plan determined.

An information processing system according to another aspect of the present disclosure includes: an acquisition unit which acquires a charging state and a deterioration state of a battery; a first determination unit which determines an upper limit of the charging state of the battery based on the deterioration state; a second determination unit which determines a charging plan of the battery based on the upper limit of the charging state determined and the charging state; and an output unit which outputs the charging plan determined.

Advantageous Effects

With the information processing method and the information processing system according to the aspects of the present disclosure, it is possible to more effectively suppress the battery deterioration than in the conventional technologies.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a schematic diagram illustrating one example of a use schedule of a battery.

FIG. 4 is a schematic diagram illustrating one example of reservation statuses of charging stations.

FIG. 5A is a data configuration diagram of a first correspondence table according to the embodiment.

FIG. 5B is a data configuration diagram of a second correspondence table according to the embodiment.

FIG. 6A is a schematic diagram illustrating one example of a charging plan according to the embodiment.

FIG. 6B is a schematic diagram illustrating one example of the charging plan according to the embodiment.

FIG. 6C is a schematic diagram illustrating one example of the charging plan according to the embodiment.

FIG. 7 is a sequence diagram of charging plan determination processing according to the embodiment.

Figure 1:
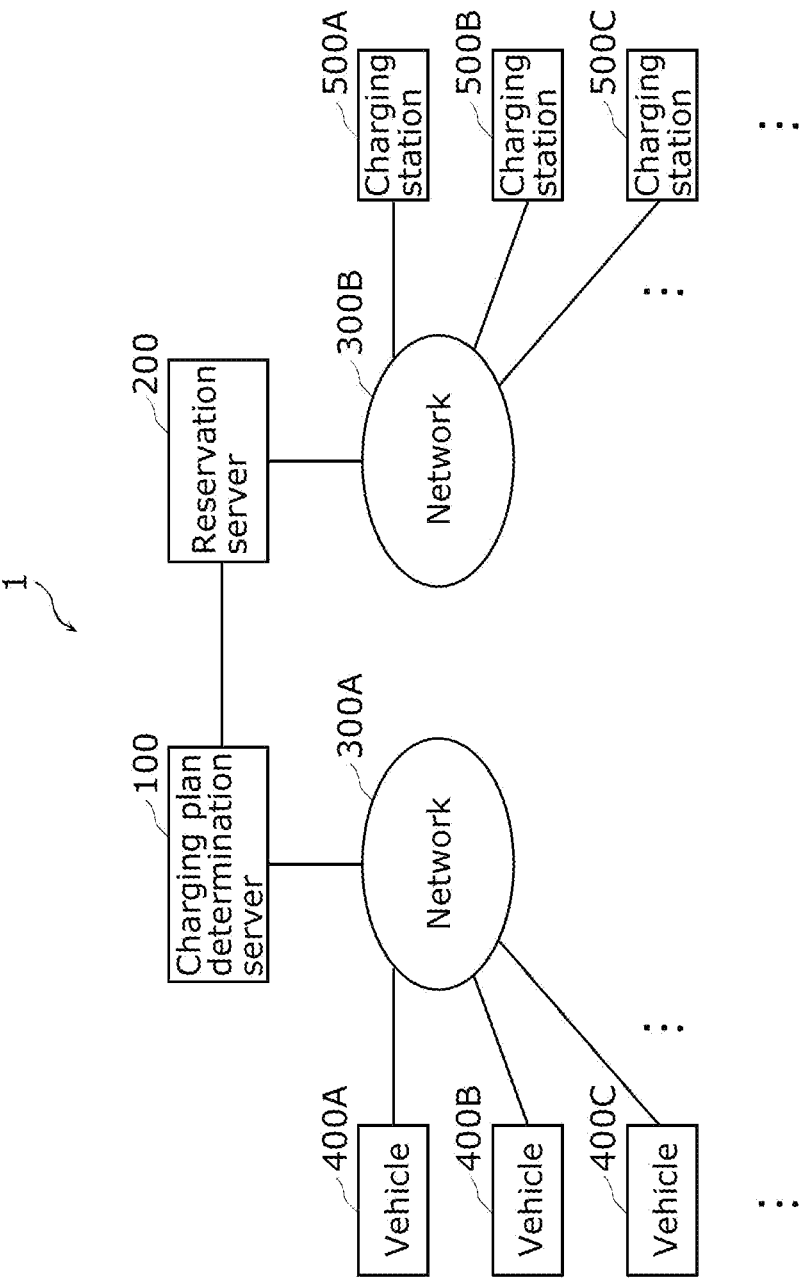
FIG. 1 is a block diagram illustrating a configuration of an information processing system according to an embodiment.

DESCRIPTION OF EMBODIMENT (Knowledge for Achieving One Aspect of Present Disclosure)

As described above, the battery charging time zone is determined in accordance with the battery type in the conventional technologies. Consequently, it is possible to suppress the battery deterioration at a given level. However, the effect of the suppression is limited. Thus, the inventor has earnestly studied a method for determining a charging plan that can more effectively suppress the battery deterioration than in the conventional cases. Then the inventor has found out that the battery deterioration can be more effectively suppressed than in the conventional cases by determining a charging plan in view of not only battery static states such as a battery type but also battery dynamic states such as a charging state and a deterioration state of the battery. As a result, the inventor has come to conceive an information processing method and an information processing system described below.

An information processing method for use in a computer according to one aspect of the present disclosure includes: acquiring a charging state and a deterioration state of a battery, determining an upper limit of the charging state of the battery based on the deterioration state, determining a charging plan of the battery based on the upper limit of the charging state determined and the charging state, and outputting the charging plan determined.

With the information processing method, outputted is the charging plan of the battery which is determined in consideration of dynamic states of the battery such as the charging state and the deterioration state of the battery, which are not considered in the conventional technologies. Therefore, the information processing method makes it possible to more effectively suppress the battery deterioration than in the conventional technologies.

Moreover, a use schedule of the battery may be acquired, a lower limit of the charging state of the battery may be determined based on the deterioration state, and the charging plan may be determined based on the lower limit and the use schedule. A too low charging state of the battery increases the degree of deterioration of the battery. On the contrary, with the present configuration, the charging plan is determined based on the use schedule of the battery and the lower limit of the charging state of the battery, which therefore makes it possible to suppress the promotion of the deterioration as a result of a fall of the charging state of the battery below the lower limit after the use of the battery.

Moreover, the position of a vehicle loaded with the battery and the positions of a plurality of charging stations may be acquired and based on the position of the vehicle and the positions of the plurality charging stations, the charging plan including information indicating charging locations may be determined. Consequently, the charging station where charging is to be carried out is determined in accordance with the current charging state and a distance between the current location of the vehicle loaded with the battery and the charging station, which therefore makes it possible to suppress electricity shortage before arrival at the charging station and the promotion of the deterioration due to an excessive fall of the charging state before the arrival at the charging station.

Moreover, the position of the vehicle loaded with the battery and the position of the charging station may be acquired, and the charging plan including information indicating charging time may be determined based on the position of the vehicle and the position of the charging station. Consequently, the charging time is determined in accordance with the current charging state and the distance to the charging station, which therefore makes it possible to carry out charging before the occurrence of electricity shortage and before the excessive fall of the charging state.

Moreover, respective distances between the plurality of charging stations and a movement route of the vehicle loaded with the battery may be acquired and the charging plan including information indicating the charging stations may be determined based on the respective distances between the movement route and the plurality of charging stations. Consequently, the charging station where the charging is to be carried out is determined in accordance with the current charging state and the distances between the movement route and the charging stations, which therefore makes it possible to suppress the electricity shortage before the arrival at the charging station and the promotion of the deterioration as a result of the excessive fall of the charging state before the arrival at the charging station.

Moreover, the charging plan may include information indicating the upper limit of the charging state. Consequently, a user or a charger control system can recognize the upper limit of the charging state of the battery and control the charger so that the charging state does not exceed the aforementioned upper limit.

Moreover, the charging plan may include information indicating charging time. Consequently, the user or the charger control system can carry out the charging without reference to the charging state of the battery so that the charging state of the battery does not exceed the aforementioned upper limit.

Moreover, a reservation status of the charging station may be acquired from a reservation server, the charging plan may be determined based on the reservation status, and the determined charging plan may be outputted as a reservation request to the reservation server. Consequently, it is possible to automatically make a reservation based on the charging plan with which the battery deterioration is suppressed.

Moreover, determining the upper limit of the charging state may include determining the upper limit of the charging state based on the degree of deterioration progress according to the degree of the deterioration state. The degree of deterioration progress changes depending on the degree of the deterioration state of the battery. On the contrary, with the present configuration, it is possible to determine the upper limit of the charging state which can suppress the deterioration progress of the battery.

Moreover, acquiring the permitted degree of deterioration progress and determining the upper limit of the charging state may include determining the upper limit of the charging state based on the degree of deterioration progress according to the degree of the deterioration state and the permitted degree of deterioration progress. Consequently, it is possible to control the balance between the suppression of the deterioration progress of the battery and the battery usability.

Moreover, determining the upper limit of the charging state may correspond to determining the aforementioned upper limit based on at least one of the deterioration state, a current amount at time of charging the battery, a current amount at time of discharging the battery, a temperature, and the charging state. Consequently, it is possible to determine the upper limit of the charging state based on parameters related to the deterioration progress of the battery and improve the accuracy of the aforementioned upper limit. As a result, it is possible to achieve both the suppression of the battery deterioration and the use efficiency of the battery.

An information processing system according to one aspect of the present disclosure includes: an acquisition unit which acquires a charging state and a deterioration state of a battery; a first determination unit which determines an upper limit of the charging state of the battery based on the deterioration state; a second determination unit which determines a charging plan of the battery based on the upper limit of the charging state determined and the charging state; and an output unit which outputs the charging plan determined.

With the information processing system described above, outputted is the charging plan of the battery determined in consideration of dynamic states of the battery such as the charging state and the deterioration state of the battery, which are not considered in the conventional technologies. Therefore, with the information processing system, it is possible to more effectively suppress the battery deterioration than in the conventional technologies.

Hereinafter, detailed examples of an information processing method and an information processing system according to the aspects of the present disclosure will be described with reference to the drawings. The embodiment described indicates one detailed example. Therefore, numerical values, shapes, components, and arrangement and connection modes of the components as well as steps, a sequence of steps, etc. each form one example and are not intended to limit the present disclosure. Of the components in the embodiment below, those not described in an independent claim are components that can be optionally added. Moreover, each of the drawings is a schematic diagram and does not necessarily provide a precise illustration.

Note that comprehensive or detailed aspects of the present disclosure may be realized by a system, a method, an integrated circuit, a computer program, or a computer-readable recording medium such as a CD-ROM or may be realized by combining together the system, the method, the integrated circuit, the computer program and the computer-readable recording medium in a desired manner.

Embodiment 1

[1. Configuration of Information Processing System]

Hereinafter, an information processing system according to the embodiment will be described below. The information processing system determines a charging plan of a battery loaded on a vehicle based on a charging state and a deterioration state of the battery.

FIG. 1 is a block diagram illustrating the configuration of information processing system 1 according to Embodiment 1.

As illustrated in FIG. 1, information processing system 1 includes charging plan determination server 100, reservation server 200, network 300A, network 300B, vehicles 400A to 400C, and charging stations 500A to 500C. Hereinafter, vehicles 400A to 400C will also be simply referred to as vehicle 400 and charging stations 500A to 500C will also be simply referred to as charging station 500.

Vehicle 400 is loaded with a battery and travels by use of an electric power of the battery loaded. Vehicle 400 acquires a charging state and a deterioration state of the battery loaded. More specifically, the charging state of the battery here may be, for example, a current charging ratio where full charging is set to 100%. More specifically, for example, the deterioration state of the battery may be a current deterioration ratio where a deteriorating state is set to 100% until new charging can be no longer performed. Vehicle 400 may acquire a cumulative distance of travel by the battery loaded and may estimate the deterioration state of the battery based on the acquired cumulative travel distance. Moreover, vehicle 400 may acquire a current amount at time of charging the battery loaded and may estimate the deterioration state of the battery based on the acquired current amount at time of charging. Moreover, vehicle 400 may acquire a current amount at time of discharging the battery loaded (at time of travel of vehicle 400) and may estimate the deterioration state of the battery based on the acquired current amount at time of discharging. Moreover, vehicle 400 may estimate the deterioration state based on passage time from the manufacture of the battery or after completion of the charging. Moreover, vehicle 400 may estimate the deterioration state of the battery based on a combination of both. Alternatively, for example, vehicle 400 may be loaded with a deterioration state measurement device capable of measuring the deterioration state of the battery and may use the loaded deterioration state measurement device to acquire the deterioration state of the battery. Vehicle 400 includes: an input device which receives an operation from a user who uses vehicle 400; and an output device which outputs information to the user. The input device may be, for example, a touch pad or a keyboard. The output device may be, for example, a display or a speaker. Assumed here is that vehicle 400 includes a touch pad as the input device and includes a display as the output device. The user can input a use schedule of the battery loaded on vehicle 400 and a movement route of vehicle 400 by use of the input device. The use schedule of the battery includes factors such as a scheduled or assumed travel route, a travel distance, a loading amount, a speed, and an acceleration, which have influence on a battery consumption speed (in other words, a power consumption amount per unit time). For example, the use schedule of the battery may be a travel schedule of vehicle 400. Vehicle 400 acquires the position of an own vehicle. For example, vehicle 400 may acquire the position of the own vehicle by use of a GPS. Vehicle 400 is connected to charging plan determination server 100 via network 300A in a communicable manner.

Charging station 500 charges the battery loaded on vehicle 400. Charging station 500 may be capable of charging the battery based on, for example, a plurality of types of charging (also referred to as charging modes, including, for example, a normal charging method, fast charging method, etc.). Charging station 500 includes an input device which receives an operation from a manager of charging station 500; and an output device which outputs information to the manager. The input device may be, for example, a touch pad or a keyboard. The output device may be, for example, a display or a speaker. Assumed here is that charging station 500 includes a touch pad as the input device and includes a display as the output device. The manager can use the input device to input a use reservation of charging station 500 and benefits provided to a user who uses charging station 500. The benefits may be, for example, 5% discount from a normal fee for the user who uses charging station 500 in a predetermined time zone (for example, an off-season period). Moreover, the benefits may include contents such as presenting a gift to a user who uses the charging station after previously making a reservation. The benefits may also include contents such as providing 20% discount from a normal fee for a user who has carried out normal charging without using fast charging. Charging station 500 is connected to reservation server 200 via network 300B in a communicable manner.

Reservation server 200 is connected to a plurality of charging stations 500 via network 300B in a communicable manner. Reservation server 200 acquires, from each charging station 500, a reservation status, benefits, and the position of charging station 500 and perform management thereof. Reservation server 200 is further connected to charging plan determination server 100 in a communicable manner.

Charging plan determination server 100 is connected to a plurality of vehicles 400 via network 300A in a communicable manner, and determines, from each vehicle 400, a charging plan of a battery loaded on vehicles 400. Charging plan determination server 100 is further connected to reservation server 200 in a communicable manner.

Charging plan determination server 100 and reservation server 200 may be realized by a computer including, for example, a processor and a memory. In this case, each of components of charging plan determination server 100 and reservation server 200 may be realized by, for example, executing one or more programs stored in the memory by the processor. Moreover, charging plan determination server 100 and reservation server 200 may be realized through cooperative operation of a plurality of mutually communicable computers each including, for example, a processor and a memory. In this case, each of components of charging plan determination server 100 and reservation server 200 may be realized, for example, by executing one or more programs stored in any one or more of the memories by any one or more of the processors. Here, charging plan determination server 100 and reservation server 200 are realized by a computer including a processor and a memory.

Note that the functions of the charging plan determination server and the reservation server may be realized with the same server.

Figure 2:
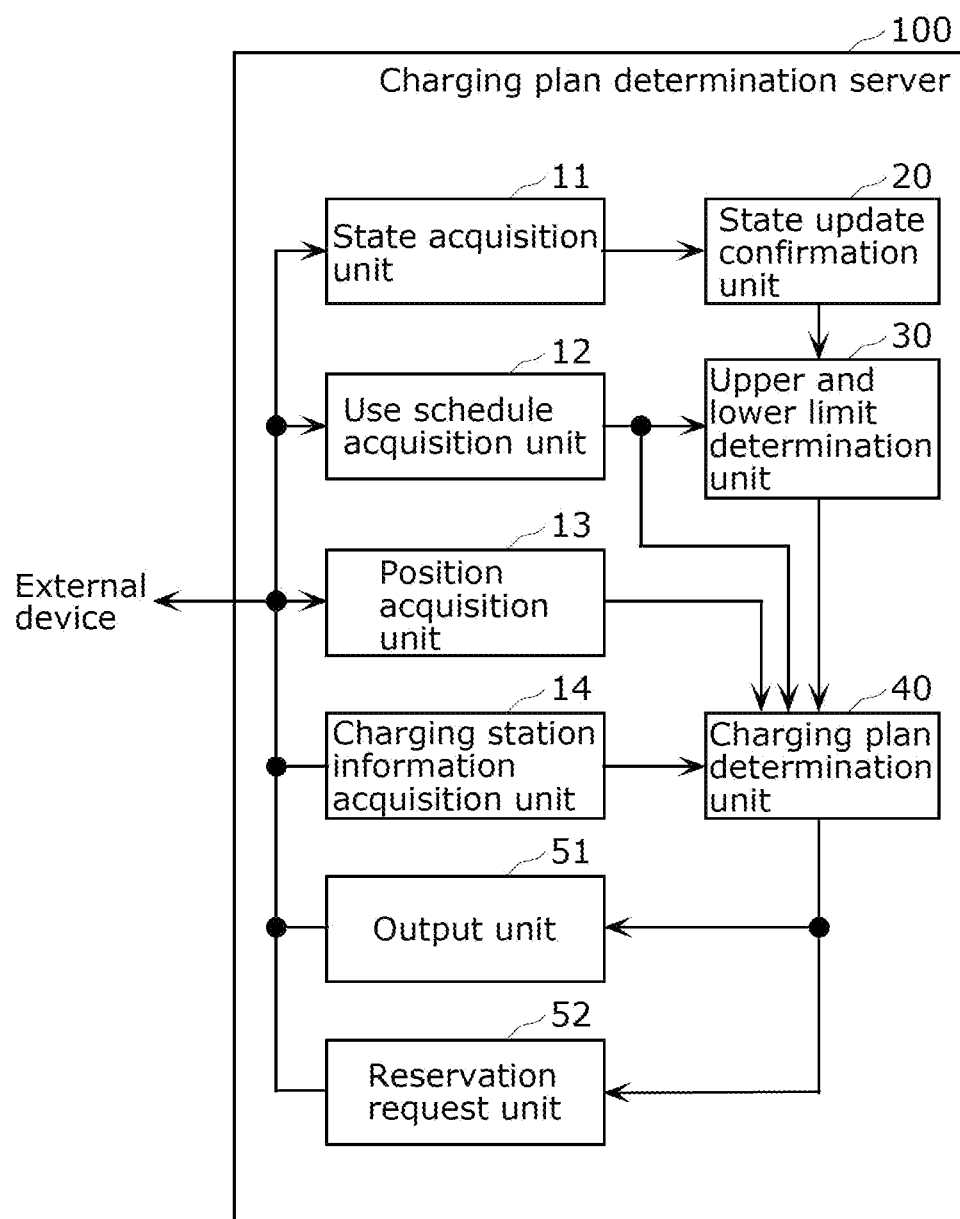
FIG. 2 is a block diagram illustrating a configuration of a charging plan determination server according to the embodiment.

FIG. 2 is a block diagram illustrating a configuration of charging plan determination server 100.

As illustrated in FIG. 2, charging plan determination server 100 includes: state acquisition unit 11, use schedule acquisition unit 12, position acquisition unit 13, charging station information acquisition unit 14, state update confirmation unit 20, upper and lower limit determination unit 30, charging plan determination unit 40, output unit 51, and reservation request unit 52.

State acquisition unit 11 acquires, from each vehicle 400, the charging state and the deterioration state of a battery loaded on vehicle 400. Then the acquired charging state and deterioration state of the battery are stored while linked to information specifying vehicle 400 which originally acquired the aforementioned states. For example, each vehicle 400 may transmit the charging state and the deterioration state of the battery on a regular basis. Then state acquisition unit 11 may receive the charging state and the deterioration state of the battery, which have been transmitted from each vehicle 400 on a regular basis, to thereby acquire the charging state and the deterioration state of the battery. Moreover, for example, state acquisition unit 11 may transmit, to each vehicle 400, a request for transmitting the charging state and the deterioration state of the battery and receive the charging state and the deterioration state of the battery, which have been transmitted in response to the transmission request from each vehicle 400 to thereby receive the charging state and the deterioration state of the battery. State acquisition unit 11 may further acquire other information related to the states of the battery from each vehicle 400. Other information may be, for example, a cumulative distance of travel by the battery loaded, a current amount at time of charging the battery loaded, a current amount at time of discharging the battery loaded, the temperature of the battery loaded, etc.

Use schedule acquisition unit 12 acquires, from each vehicle 400, a use schedule of the battery loaded on vehicle 400. Then the acquired use schedule of the battery is stored while linked to information specifying vehicle 400 which has originally acquired the use schedule. FIG. 3 illustrates one example of the use schedule of the battery acquired by use schedule acquisition unit 12. For example, when the user who uses vehicle 400 has inputted the use schedule of the battery, each vehicle 400 may transmit the inputted use schedule of the battery to charging plan determination server 100, and use schedule acquisition unit 12 may receive the use schedule of the battery, which has been transmitted from each vehicle 400, to thereby acquire the use schedule of the battery. Moreover, for example, state acquisition unit 11 may transmit, to each vehicle 400, a request for transmitting the use schedule of the battery and receive the use schedule of the battery which has been transmitted in response to the transmission request from each vehicle 400 to thereby acquire the use schedule of the battery. Use schedule acquisition unit 12 may not acquire the use schedule of the battery from vehicle 400 in which the use schedule of the battery is not inputted.

Position acquisition unit 13 acquires the position of vehicle 400 from each vehicle 400. Then the acquired position of vehicle 400 is stored while linked to the information specifying vehicle 400 the position of which has been acquired. For example, each vehicle 400 may transmit the position of vehicle 400 to charging plan determination server 100 on a regular basis and position acquisition unit 13 may receive the position of vehicle 400, which is transmitted from each vehicle 400 on a regular basis, to thereby acquire the charging state and the deterioration state of the battery. Moreover, for example, position acquisition unit 13 may transmit, to each vehicle 400, a request for transmitting the position of vehicle 400 and receive the position of vehicle 400, which has been transmitted from each vehicle 400 in response to the transmission request to thereby acquire the position of vehicle 400. State acquisition unit 11 may further acquire the movement route from each vehicle 400. In this case, state acquisition unit 11 may not acquire the movement route from vehicle 400 movement route of which has not been inputted.

Charging station information acquisition unit 14 acquires, from reservation server 200, the reservation status and benefits of each charging station 500. Then the acquired reservation status and benefits are stored. FIG. 4 illustrates one example of the reservation status acquired by charging station information acquisition unit 14. For example, charging station information acquisition unit 14 may transmit, to reservation server 200, a request for transmitting the reservation status, the benefits, and the position of each charging station 500 and receive the reservation status, the benefits, and the position of each charging station 500, which have been transmitted from reservation server 200 in response to the transmission request, to thereby acquire the reservation status, the benefits, and the position of each charging station 500. Moreover, for example, reservation server 200 may transmit, to charging plan determination server 100, the reservation status, the benefits, and the position of each charging station 500 on a regular basis and charging station information acquisition unit 14 may receive the reservation status, the benefits, and the position of each charging station 500, which are transmitted from reservation server 200 on a regular basis, to thereby acquire the reservation status, the benefits, and the position of each charging station 500.

When state acquisition unit 11 has newly acquired, from each vehicle 400, the deterioration state of the battery loaded on vehicle 400, state update confirmation unit 20 confirms whether or not the deterioration state of the battery newly acquired has been updated from the deterioration state of the battery acquired last time. Here, the update refers to a case where the deterioration state of the battery newly acquired has fluctuated from the deterioration state of the battery acquired last time by a predetermined amount or more.

When state update confirmation unit 20 has confirmed, for each one vehicle 400 (hereinafter referred to as "specific vehicle 400"), that the deterioration state of the battery has been updated, upper and lower limit determination unit 30 determines, based on the aforementioned deterioration state of the battery, the upper limit of the charging state of the battery loaded on specific vehicle 400 described above. More specifically, upper and lower limit determination unit 30 stores, for each battery type, a first correspondence table indicating correspondence between the charging state of the battery (that is, a remaining amount of the battery), the deterioration state of the battery (that is, the cumulative deterioration amount of the battery), and a deterioration amount (that is, the amount of deterioration newly occurring in the battery as a result of newly charging the aforementioned battery, in other words, the degree of deterioration). Upper and lower limit determination unit 30 determines the upper limit of the charging state of the battery based on the updated deterioration state of the battery, the stored first correspondence table, and the predefined permitted deterioration amount.

FIG. 5A is a data configuration diagram of the first correspondence stable stored by upper and lower limit determination unit 30.

With reference to the first correspondence table, upper and lower limit determination unit 30 specifies, from among the deterioration amounts (a1, a2, a3, b1, b2, b3, etc. here) corresponding to the updated deterioration states of the battery (here, the cumulative deterioration amounts), one of those which do not exceed the predefined permitted deterioration amount. Then upper and lower limit determination unit 30 determines the upper limit of the charging state corresponding g to the specified deterioration amount as the upper limit of the charging state of the battery.

For example, the first correspondence table is created by use of data acquired by previously performing an experiment. Note that a table for determining the upper limit of the charging state may be determined based on fluctuation elements. For example, where the deterioration state, that is, the cumulative deterioration amount is provided as input, a table according to the inputted cumulative deterioration amount is determined based on a basic table indicating relation between the cumulative deterioration amount and the upper limit of the charging state. The fluctuation elements include, in addition to the cumulative deterioration amount, the amount of a current flowing at time of charging, the amount of a current flowing at time of discharging, the temperature of the battery, the charging state, etc. When the fluctuation element is the charging state, the table may be determined in consideration of a change in the charging state. Note that table determination processing based on the fluctuation element may be performed instead of the processing of determining the upper limit of the charging state by use of a correction amount to be described later on with reference to FIG. 5B.

When state acquisition unit 11 has acquired other information related to the state of the battery together with the updated deterioration state for specific vehicle 400, upper and lower limit determination unit 30 may determine the upper limit of the charging state of the battery by use of the acquired other information described above. In this case, upper and lower limit determination unit 30 stores, for each battery type, a second correspondence table indicating the correspondence between the charging state, the deterioration state of the battery, the deterioration amount, and the correction amount of the deterioration amount according to other information and determines the upper limit of the charging state of the battery based on the updated deterioration state of the battery, other information, the stored second correspondence table, and the predefined permitted deterioration amount.

FIG. 5B is a data configuration diagram of the second correspondence table stored by upper and lower limit determination unit 30.

When other information is, for example, the current amount at time of charging the battery, the correction amounts (Δe1, Δe2, Δe3, Δf1, Δf2, Δf3, etc., here) are positive values which increase with an increase in the current amount. For example, when other information is the current amount at time of discharging the battery, the correction amounts are positive values which increase with an increase in the current amount. On the other hand, when other information is the temperature of the battery, the correction amounts are either positive values or negative values in accordance with the temperature of the battery.

With reference to the second correspondence table, upper and lower limit determination unit 30 specifies, from among sums of the deterioration amount corresponding to the updated deterioration state of the battery and the correction amount, one of those which do not exceed the predefined permitted deterioration amount. Then upper and lower limit determination unit 30 determines the charging state corresponding to the specified sum of the deterioration amount and the correction amount as the upper limit of the charging state of the battery.

For example, the second correspondence table is created by use of data obtained by previously performing an experiment.

Upper and lower limit determination unit 30 may further determine, for specific vehicle 400, the lower limit of the charging state of the battery based on the updated deterioration state of the battery. More specifically, upper and lower limit determination unit 30 may store, for each battery type, a third correspondence table in which the deterioration state of the battery and the lower limit of the charging state of the battery are in correspondence with each other. Then upper and lower limit determination unit 30 may determine the lower limit of the charging state of the battery based on the updated deterioration state of the battery and the stored third correspondence table.

When use schedule acquisition unit 12 has acquired, from specific vehicle 400, a use schedule of the battery loaded on specific vehicle 400, upper and lower limit determination unit 30 may further estimate the charging state of the battery after the use schedule of the battery based on the updated deterioration state of the battery and the use schedule of the battery. Then the upper and lower limit determination unit 30 may determine the lower limit of the charging state of the battery at time of charging in a manner such that the estimated charging state of the battery after the use schedule of the battery does not fall below the lower limit of the charging state of the battery at time of charging.

When upper and lower limit determination unit 30 has determined the upper limit of the charging state of the battery loaded on specific vehicle 400, charging plan determination unit 40 determines a charging plan of the battery indicating contents of charging which suppresses the battery deterioration based on the determined upper limit of the charging state and the charging state of specific vehicle 400 acquired by state acquisition unit 11.

When upper and lower limit determination unit 30 has determined the lower limit of the charging state of the battery loaded on specific vehicle 400 and use schedule acquisition unit 12 has acquired the use schedule of the battery loaded on specific vehicle 400, charging plan determination unit 40 may determine the charging plan of the battery based on the lower limit of the charging state of the battery and the use schedule of the battery.

When position acquisition unit 13 has acquired the position of specific vehicle 400 and charging station information acquisition unit 14 has acquired the position of charging station 500, charging plan determination unit 40 may determine the charging plan of the battery including information indicating a charging location based on the position of specific vehicle 400 and the position of charging station 500. In this case, for example, charging plan determination unit 40 may determine, as the charging locations, a predetermined number of charging stations 500 in order starting with a location closest to or close to the position of specific vehicle 400. Moreover, charging plan determination unit 40 may determine, as the charging locations, a predetermined number of charging stations 500 in order starting with the lowest fee or low fee. Moreover, charging plan determination unit 40 may determine, as the charging locations, charging stations 500 by combining together the aforementioned plurality of elements.

When position acquisition unit 13 has acquired the travel route of specific vehicle 400 and charging station information acquisition unit 14 has acquired the position of charging station 500, charging plan determination unit 40 may determine the charging plan of the battery including information indicating the charging locations based on the travel route of specific vehicle 400 and the position of charging station 500. In this case, for example, charging plan determination unit 40 may determine, as the charging locations, the predetermined number of charging stations f500 in order starting with the location closest or close to the travel route of specific vehicle 400.

When position acquisition unit 13 has acquired the position of specific vehicle 400 and charging station information acquisition unit 14 has acquired the position of one charging station 500, charging plan determination unit 40 may determine the charging plan of the battery including information indicating charging time based on the position of specific vehicle 400 and the position of one charging station 500. Here, the charging time may be any of charging start time, charging end time, or/and time required for the charging, or a combination thereof. In this case, for example, charging plan determination unit 40 may estimate time of movement from the position of specific vehicle 400 to the position of one charging station 500 to determine the charging start time or may determine the time required for the charging based on the charging capability of one charging station 500 or the charging end time.

When charging station information acquisition unit 14 has acquired the benefits of the plurality of charging stations 500, charging plan determination unit 40 may determine the charging plan of the battery including information indicating the charging location based on the benefits. In this case, for example, charging plan determination unit 40 may determine, as the charging location, a predetermined number of charging stations 500 in order starting with the one at which profits received from the benefits by the user who uses specific vehicle 400 is greatest or great.

When charging station information acquisition unit 14 has acquired the reservation statuses of the plurality of charging stations 500, charging plan determination unit 40 may determine the charging plan of the battery including information indicating the charging locations based on the reservation statuses. In this case, charging plan determination unit 40 may determine the charging plan so as not to perform charging in reservation time zones indicated by the reservation statuses in the plurality of charging stations 500 or may determine the charging plan based on the occupancy rate of each charging station 500 estimated from the reservation status so that the occupancy rate of specific charging station 500 does not become too high or too low.

When charging plan determination unit 40 has determined the charging plan based on the reservation status, reservation request unit 52 transmits (that is, outputs) the determined charging plan as a reservation request to reservation server 200. When a response to the reservation request has been transmitted from reservation server 200 after the transmission of the reservation request to reservation server 200, reservation request unit 52 receives the response.

When charging plan determination unit 40 has determined the charging plan for specific vehicle 400, output unit 51 transmits (that is, outputs) the determined charging plan to specific vehicle 400.

Figure 6C:
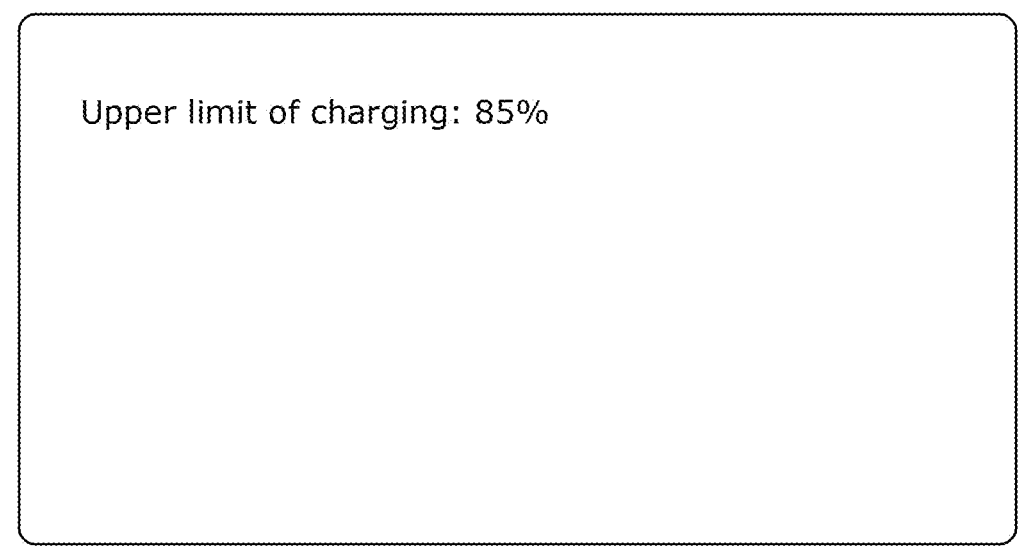

FIGS. 6A, 6B, and 6C are schematic diagrams each illustrating one example of the charging plan outputted by output unit 51.

The charging plan illustrated in FIG. 6A is the example of the charging plan including a plurality of recommended plans each including: the name of charging station (charging location), charging start time (charting time), charging end time (charging time), the type of charging (charging mode), the upper limit of the charging state, the price, and benefits.

The charging plan illustrated in FIG. 6B is the example of the charging plan outputted from output unit 51 when reservation request unit 52 has received a positive response returned from reservation server 200 after reservation request unit 52 transmitted the charging plan as the reservation request to reservation server 200.

The charging plan illustrated in FIG. 6C is the example of the charging plan including only the upper limit of the charging state.

For example, output unit 51 may transmit, to vehicle 400 previously registered in charging plan determination server 100, the charging plan including only the upper limit of the charging state (for example, the charging plan illustrated in FIG. 6C) and may transmit, to other vehicles 400, the charging plan (for example, the charging plan illustrated in FIG. 6A) including other information in addition to the upper limit of the charging state.

[2. Operation of Information Processing System]

Information processing system 1 with the aforementioned configuration performs charging plan determination processing of determining the charging plan of vehicle 400.

One example of the charging plan determination processing performed by information processing system 1 will be described below, referring to FIGS. 7 and 8.

FIG. 7 is a sequence diagram of the charging plan determination processing.

Figure 8:
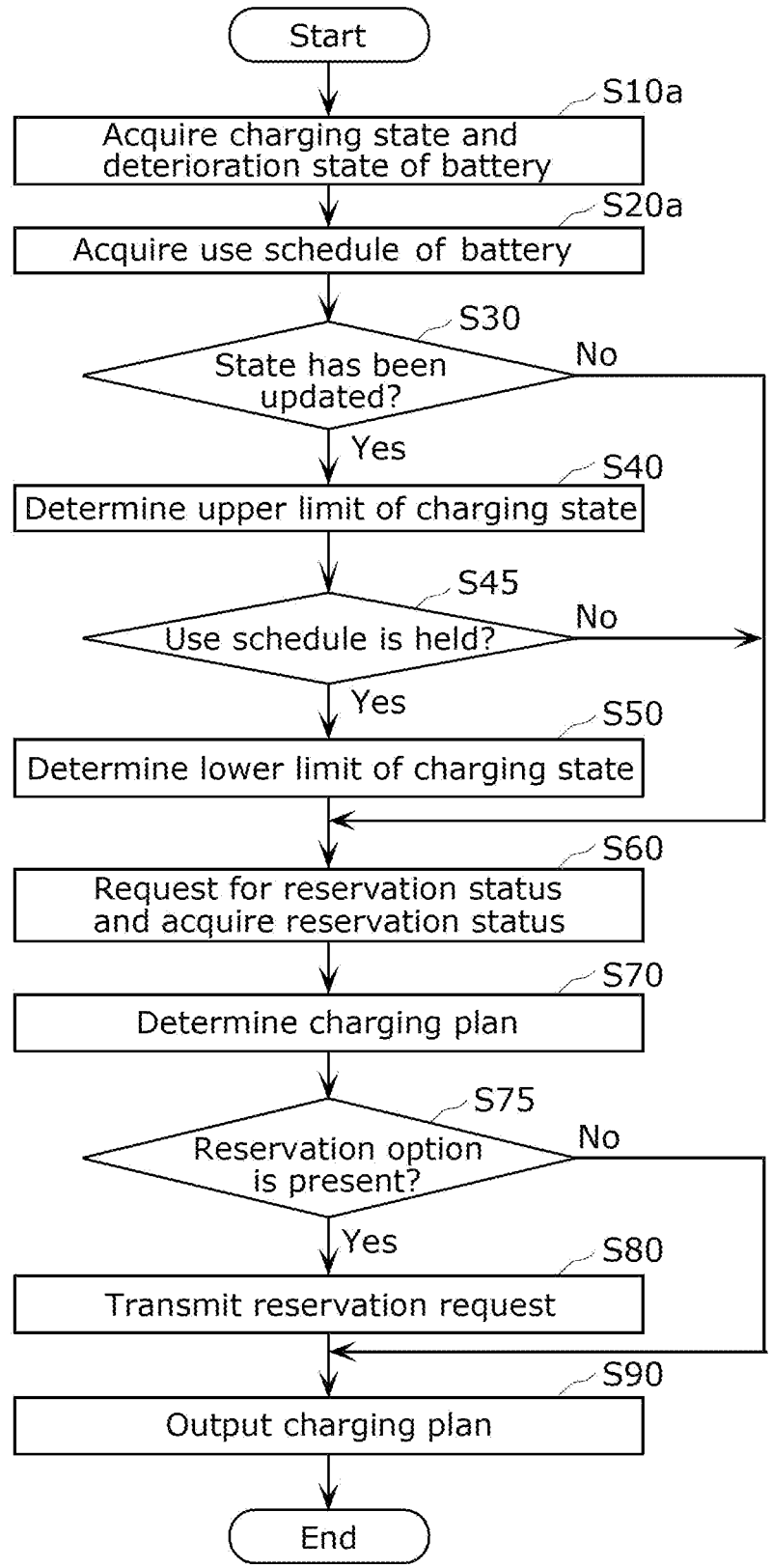
FIG. 8 is a flowchart of an operation performed by the charging plan determination server according to the embodiment.

FIG. 8 is a flowchart of an operation performed by charging plan determination server 100 in the charging plan determination processing.

Vehicle 400 acquires the charging state and the deterioration state of the battery loaded and transmits the acquired charging state and deterioration state of the battery to charging plan determination server 100 (step S10). At this point, when vehicle 400 has acquired other information related to the states of the battery loaded, vehicle 400 may not only transmit the charging state and the deterioration state of the battery but also transmit the other information related to the states of the battery to charging plan determination server 100.

When vehicle 400 has transmitted the charging state and the deterioration state of the battery, state acquisition unit 11 receives and thereby acquires the transmitted charging state and deterioration state of the battery (step S10a). At this point, when vehicle 400 has transmitted the other information related to the states of the battery, state acquisition unit 11 receives and thereby acquires the transmitted other information related to the states of the battery.

Vehicle 400 transmits, to charging plan determination server 100, the use schedule of the battery loaded, which has been inputted by the user who uses vehicle 400 (step S20). When the use schedule of the battery has not been inputted, vehicle 400 may not transmit the use schedule of the battery.

When the use schedule of the battery has been transmitted from vehicle 400, use schedule acquisition unit 12 receives and thereby acquires the transmitted use schedule of the battery (step S20a).

When the charging state and the deterioration state of the battery have been acquired, state update confirmation unit 20 confirms whether or not the newly acquired deterioration state of the battery has been updated from the deterioration state of the battery acquired last time (step S30).

When it has been confirmed in the processing of step S30 that the deterioration state of the battery has been updated (Yes in step S30), upper and lower limit determination unit 30 determines the upper limit of the charging state of the battery based on the deterioration state of the battery (step S40). At this point, when state acquisition unit 11 has received the other information related to the states of the battery from vehicle 400, upper and lower limit determination unit 30 may determine the upper limit of the charging state of the battery based on the other information related to the states of the battery.

When the upper limit of the charging state of the battery has been determined, upper and lower limit determination unit 30 confirms whether or not the use schedule of the battery has been acquired by use schedule acquisition unit 12 (step S45).

When it has been confirmed in the processing of step S45 that the use schedule of the battery was acquired in the processing (Yes in step S45), upper and lower limit determination unit 30 determines the lower limit of the charging state of the battery based on the deterioration state of the battery and the use schedule of the battery (step S50).

When the processing in step S50 has ended, when it has been confirmed in the processing in step S30 that the deterioration state of the battery was not updated (No in step S30) and when it has been confirmed in the processing of step S45 that the use schedule of the battery was not acquired (No in step S45), charging station information acquisition unit 14 transmits a request for transmitting the reservation status of each charging station 500 to reservation server 200 (step S60). Note that even when use schedule acquisition unit 12 has not acquired the use schedule of the battery (that is, No in step S45), upper and lower limit determination unit 30 may determine the lower limit of the charging state based on the deterioration state of the battery (step S50).

When the request for transmitting the reservation status has been transmitted to reservation server 200, reservation server 200 receives the request for transmitting the reservation status. Then reservation server 200 transmits the reservation status of each charging station 500 in response to the request for transmitting the reservation status (step S65). At this point, reservation server 200 may transmit the benefits and the position of each charging station 500 in addition to the reservation status of each charging station 500.

When the reservation status of each charging station 500 has been transmitted from reservation server 200, charging station information acquisition unit 14 receives and thereby acquires the transmitted reservation status of each charging station 500. At this point, when the benefits and the position of each charging station 500 have been transmitted from reservation server 200, charging station information acquisition unit 14 receives and thereby acquires the transmitted benefits and position of each charging station 500.

When the reservation status of each charging station 500 has been acquired, charging plan determination unit 40 determines the charging plan of the battery based on the upper limit of the charging state of the battery determined by upper and lower limit determination unit 30, the charging state of the battery acquired by state acquisition unit 11, and the reservation status of each charging station 500 acquired by charging station information acquisition unit 14 (step S70). At this point, when position acquisition unit 13 has acquired the position or/and the travel route of vehicle 400 or/and when charging station information acquisition unit 14 has acquired the benefits or/and the position of each charging station 500, charging plan determination unit 40 may determine the charging plan of the battery based on the position of vehicle 400, the travel route of vehicle 400, the benefits of each charging station 500, or/and the position of each charging station 500. Note that charging plan determination unit 40 may determine the charging plan of the battery not based on the reservation status of each charging station 500 but based on the upper limit of the charging state of the battery determined by upper and lower limit determination unit 30 and the charging state of the battery acquired by state acquisition unit 11 regardless of whether or not the reservation status of each charging station 500 has been acquired (step S70).

When the charging plan of the battery has been determined, reservation request unit 52 investigates whether or not target vehicle 400 is a vehicle with a reservation option (step S75). Here, the vehicle with a reservation option refers to a vehicle which is previously registered in charging plan determination server 100 as a vehicle targeted for the outputting of the determined charging plan of the battery as a reservation request to reservation server 200 when the charging plan of the battery has been determined.

When target vehicle 400 is a vehicle with a reservation option in the processing of step S75 (Yes in step S75), reservation request unit 52 transmits and thereby outputs the charging plan of the battery determined by charging plan determination unit 40 as a reservation request to reservation server 200 (step S80). Note that reservation request unit 52 may transmit the charging plan of the battery determined by charging plan determination unit 40 as the reservation request to reservation server 200 regardless of whether or not target vehicle 400 is a vehicle with a reservation option (step S80).

When target vehicle 400 is not the vehicle with a reservation option in the processing of step S75 (No in step S75) and when the processing of step S80 has ended, output unit 51 transmits and thereby outputs the charging plan determined by charging plan determination unit 40 to vehicle 400 (step S90). Then vehicle 400 receives the transmitted charging plan and outputs the received charging plan by use of an output device.

When the processing of step S90 has ended, information processing system 1 ends the charging plan determination processing.

[3. Discussion]

In information processing system 1 having the aforementioned configuration, outputted is the charging plan of the battery determined in consideration of dynamic states of the battery such as the charging state and the deterioration state of the battery, which are not considered in the conventional technologies. Therefore, information processing system 1 described above can more effectively suppress the battery deterioration than in the conventional technologies.

[Note]

The information processing system according to one aspect of the present disclosure has been described based on the embodiment above, but the present disclosure is not limited to the present embodiment. The one obtained by making various modifications conceivable by those skilled in the art to the present embodiment and a mode formed by combining together the components in the different embodiments may also be included in a range of one or a plurality of modes of the present disclosure without departing from the spirits of the present disclosure.

(1) The embodiment refers to an example in which vehicle 400 acquires the deterioration state of the battery and state acquisition unit 11 receives the deterioration state of the battery transmitted from vehicle 400, as a result of which information processing system 1 acquires the deterioration state of the battery. However, if state acquisition unit 11 can acquire the deterioration state of the battery loaded on vehicle 400, the configuration of information processing system 1 is not necessarily limited to the example of the aforementioned configuration. Information processing system 1 may have, for example, a configuration such that vehicle 400 acquires information (for example, a cumulative distance of travel by the loaded battery, the current amount at time of charging the battery loaded, the current amount at time of discharging the battery loaded, etc.) that permits the estimation of the deterioration state of the battery and transmits the information to charging plan determination server 100, and state acquisition unit 11 receives the information that has been transmitted from vehicle 400 and that permits the estimation of the deterioration state of the battery and estimates the deterioration state of the battery from the received information that permits the estimation of the deterioration state of the battery to thereby acquire the deterioration state of the battery loaded on vehicle 400.

(2) The embodiment refers to the example in which information processing system 1 has the configuration such that upper and lower limit determination unit 30 determines the upper limit of the charging state of the battery so that the predefined permitted deterioration amount is not exceeded. On the contrary, the embodiment may refer to an example, as other configuration example, in which information processing system 1 has the configuration such that upper and lower limit determination unit 30 determines the upper limit of the charging state of the battery so that the predefined permitted deterioration amount is exceeded only when it can be recognized based on the use schedule of the battery acquired by use schedule acquisition unit 12 that vehicle 400 loaded with the battery is scheduled to travel over a long distance.

(3) In the embodiment, information processing system 1 is a system having the configuration such that the charging plan of the battery is determined, targeted on the battery loaded on vehicle 400. However, the information processing system according to the present disclosure may be a system having a configuration such that the charging plan of the battery is determined, targeted on a battery loaded on a device or the like other than the battery loaded on vehicle 400. For example, the information processing system according to the present disclosure may be a system having a configuration such that the charging plan of the battery is determined, targeted on a battery loaded on a mobile device represented by a smartphone or the like.

(4) The embodiment has been described that information processing system 1 determines the charging plan of the battery. However, information processing system 1 may determine a replacement plan of the battery. More specifically, information processing system 1 acquires the use schedule of the battery, determines the lower limit of the charging state of the battery based on the deterioration state of the battery, and determines the replacement plan of the battery based on the determined lower limit, the charging state, and the use schedule of the battery. For example, information processing system 1 searches for a battery which is charged to such a degree that the charging state after use estimated based on the use schedule of the battery does not fall below the lower limit and determines a plan for replacing the loaded battery with the searched battery. Consequently, it is possible to omit time required for charging the battery.

Moreover, information processing system 1 may determine the upper limit of the charging state of the battery based on the deterioration state of the battery and determine the replacement plan of the battery based on the determined upper limit, the charging state, and the use schedule of the battery. For example, information processing system 1 searches for the battery charged to a degree such that the charging state during the use estimated based on the use schedule of the battery does not exceed the aforementioned upper limit and determines the plan for replacing the loaded battery with the searched battery. One example of a case where the charging state during the use increases refers to charging performed by a regenerative brake. When the use schedule of the battery is a schedule used for a vehicle scheduled to travel on a path with a large number of downhills, there is a risk that the charging state of the battery exceeds the aforementioned upper limit. In such a case, it is possible to suppress the deterioration of the battery by the charging performed by the regenerative brake.

(5) Part or all of components included in information processing system 1 may be formed by one system large scale integrated circuit (LSI). The system LSI is a super multiplication function LSI manufactured by integrating a plurality of component parts on one chip, more specifically a computer system formed by including, for example, a microprocessor, a read only memory (ROM), and a random access memory (RAM). The ROM stores computer programs. As a result of operation of the microprocessor in accordance with the computer program, the system LSI achieves a function thereof.

Note that the system here refers to the LSI but may refer to an IC, an LSI, a super LSI, or an ultra LSI depending on a difference in the degree of integration. Moreover, a way of providing an integrated circuit is not limited to the LSI and may be realized by a dedicated circuit or a general-purpose processor. A field programmable gate array (FPGA) capable of programming or a reconfigurable processor which is capable of reconfiguring connection and setting of circuit cells in the LSI may be used after the manufacture of the LSI.

Furthermore, it is needless to say that after the appearance of a technology of providing an integrated circuit in place of an LSI through advancement of semiconductor technologies or other derived technique, the aforementioned technology may be used to integrate functional blocks. Fr example, it is possible to apply biotechnology.

(6) One aspect of the present disclosure may be not only such an information processing system but also be an information processing method including steps with characteristic component parts included in the information processing system. Moreover, another aspect of the present disclosure may be a computer program which causes a computer to execute each of the characteristic steps included in the information processing method. Moreover, still another aspect of the present disclosure may be a computer-readable, non-transitory recording medium having such a computer program recorded thereon.

INDUSTRIAL APPLICABILITY

The present disclosure is widely usable for, for example, devices which determine a charging plan of a battery.

The invention claimed is:

1. An information processing method for use in a computer, the information processing method comprising:
   acquiring a charging state and a deterioration state of a battery;
   acquiring a use schedule of the battery;
   determining, based on the deterioration state, an upper limit of the charging state of the battery to cause a deterioration amount not to exceed a permitted deterioration amount;
   determining a charging plan of the battery based on the upper limit of the charging state determined, the use schedule, and the charging state; and
   outputting the charging plan determined,
   wherein in the determining of the upper limit, when a vehicle loaded with the battery is scheduled to travel a long distance, the upper limit is determined to cause the deterioration amount not to exceed the permitted deterioration amount.

2. The information processing method according to claim 1, further comprising:
   determining a lower limit of the charging state of the battery based on the deterioration state; and
   determining the charging plan based on the lower limit.

3. The information processing method according to claim 1, further comprising:
   acquiring a position of the vehicle and positions of a plurality of charging stations; and
   determining the charging plan including information indicating a charging location, based on the position of the vehicle and the positions of the plurality of charging stations.

4. The information processing method according to claim 1, further comprising:
   acquiring a position of the vehicle and positions of a plurality of charging stations; and
   determining the charging plan including information indicating charging time, based on the position of the vehicle and the positions of the plurality of charging stations.

5. The information processing method according to claim 1, further comprising:
   acquiring a movement route of the vehicle and positions of a plurality of charging stations; and
   determining the charging plan including information indicating a charging location, based on respective distances from the movement route to the plurality of charging stations.

6. The information processing method according to claim 1,
   wherein the charging plan includes information indicating the upper limit of the charging state.

7. The information processing method according to claim 1,
   wherein the charging plan includes information indicating charging time.

8. The information processing method according to claim 1, further comprising:
   acquiring a reservation status of a charging station from a reservation server;
   determining the charging plan based on the reservation status; and
   outputting, as a reservation request, the charging plan determined to the reservation server.

9. The information processing method according to claim 1,
   wherein the determining of the upper limit of the charging state is determining the upper limit of the charging state based on a degree of deterioration progress according to a degree of the deterioration state.

10. The information processing method according to claim 9, further comprising:
    acquiring a permitted degree of deterioration progress,
    wherein the determining of the upper limit of the charging state is determining the upper limit of the charging state based on the degree of the deterioration progress according to the degree of the deterioration state and the permitted degree of the deterioration progress.

11. The information processing method according to claim 1,
    wherein the determining of the upper limit of the charging state is determining the upper limit of the charging state based on the deterioration state and at least one of a current amount at time of charging the battery, a current amount at time of discharging the battery, a temperature, or the charging state.

12. An information processing system comprising:
    an acquisition unit that acquires a charging state and a deterioration state of a battery and a use schedule of the battery;
    a first determination unit that determines, based on the deterioration state, an upper limit of the charging state of the battery to cause a deterioration amount not to exceed a permitted deterioration amount;
    a second determination unit that determines a charging plan of the battery based on the upper limit of the charging state determined, the use schedule, and the charging state; and
    an output unit that outputs the charging plan determined,
    wherein when a vehicle loaded with the battery is scheduled to travel a long distance, the first determination unit determines the upper limit to cause the deterioration amount not to exceed the permitted deterioration amount.

* * * * *